No. 695,007. Patented Mar. 11, 1902.
C. STRUTT & O. A. HOCKEY.
WATER LEVEL INDICATOR.
(Application filed Jan. 2, 1900.)

(No Model.) 2 Sheets—Sheet 1.

Witnesses
A Fletcher
N. Lawson

Inventors
C. Strutt
O. A. Hockey
by their Attorney
W. J. Munden

No. 695,007. Patented Mar. 11, 1902.
C. STRUTT & O. A. HOCKEY.
WATER LEVEL INDICATOR.
(Application filed Jan. 2, 1900.)
(No Model.) 2 Sheets—Sheet 2.

Witnesses
G. Pitcher
F. Daley

Inventors C. Strutt & O. A. Hockey
by their Attorney W. J. Munden

UNITED STATES PATENT OFFICE.

CHARLES STRUTT AND OLIVER ARTHUR HOCKEY, OF LONDON, ENGLAND.

WATER-LEVEL INDICATOR.

SPECIFICATION forming part of Letters Patent No. 695,007, dated March 11, 1902.

Application filed January 2, 1900. Serial No. 137. (No model.)

*To all whom it may concern:*

Be it known that we, CHARLES STRUTT, a resident of 82 Lower Hamlets road, Forest Gate, London, and OLIVER ARTHUR HOCKEY, a resident of "Hartgrove," 63 Carlyle road, Manor Park, London, in the county of Middlesex, England, subjects of the Queen of Great Britain and Ireland, have invented a certain new and useful Water-Level Indicator, (for which we have obtained a patent in Great Britain, No. 14,952, bearing date July 20, 1899,) of which the following is a specification.

This invention relates to devices for indicating the height of the surface of water contained in boilers, tanks, and the like; and it consists of a simple and economical apparatus which is extremely efficient in action, unlikely to become disordered, and which can be manufactured and applied at a low cost. Moreover, when it has to be attached to existing boilers or the like it is so constructed that it can be fixed in such a short time as to cause little interruption in the use of the boiler.

It consists, essentially, of a float disposed inside the boiler at or near the level of the water-surface. The float is attached to one end of an arm, the other end of which is attached at nearly right angles to a spindle which passes through a packed gland in the side or end of the boiler-shell. The gland occupies and fills closely an opening which is formed by boring a hole in the shell of the boiler, and the other end of the spindle projecting from the boiler has attached to it at right angles an arm similar to that which carries the float inside the boiler. The outer end of this exterior arm has fixed to it a disk which corresponds in position to that of the float. Consequently when the position of the disk is ascertained by mere inspection the height of the water-surface is known.

In order that our invention may be fully understood and ascertained, we append drawings, in which—

Figure 1:
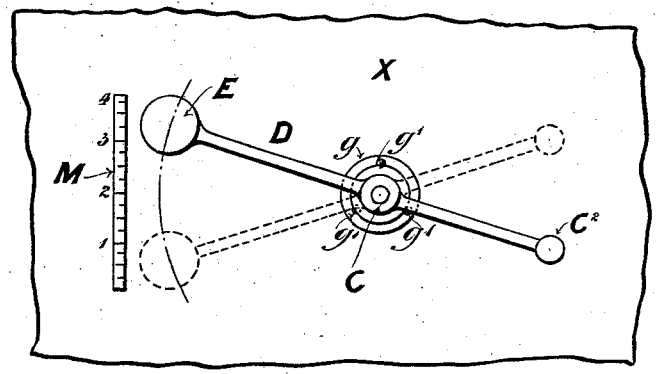
Figure 2:
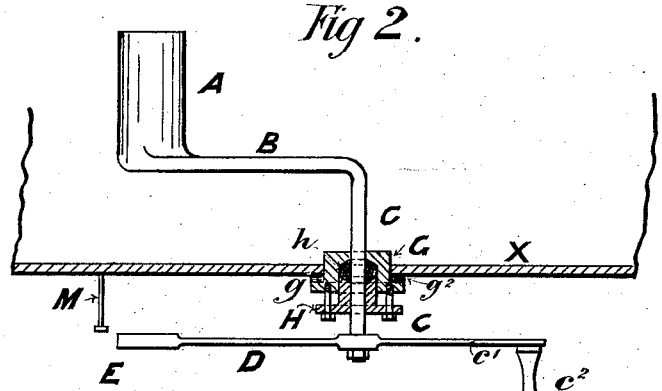
Figure 3:
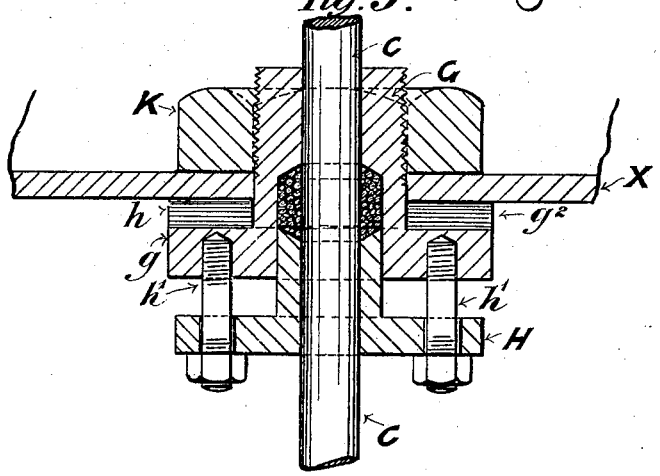
Figure 4:
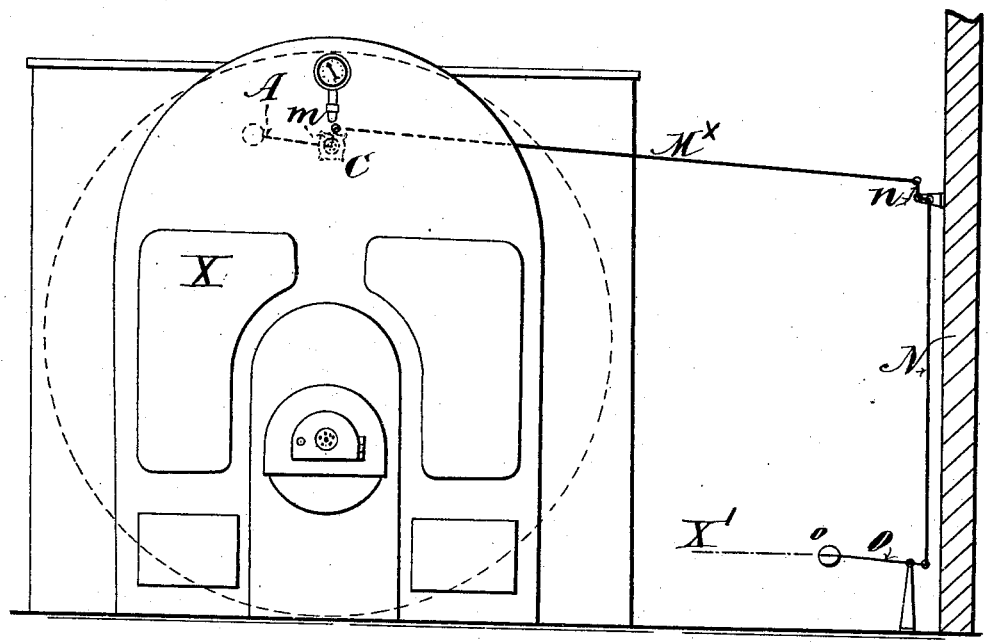
Figure 5:
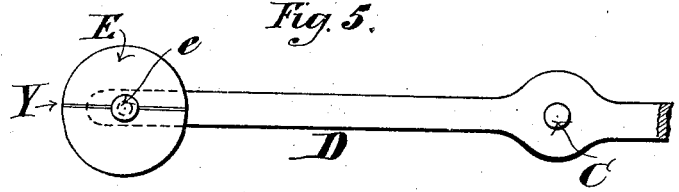

Figure 1 is an elevation of a portion of the exterior of the boiler-shell and the arm and disk. Fig. 2 is a horizontal section through the axis of the spindle. Fig. 3 is a modified form of fitting. Fig. 4 is an elevation of a boiler where the indicator is situate at a distance therefrom. Fig. 5 shows a modified disk and arm.

X indicates the shell of the boiler or tank to which the apparatus is fitted. This may be either the front, back, or side of the boiler.

The float A may be of any convenient shape, but is preferably cylindrical, and has formed integrally with or rigidly attached to it at about a right angle the arm B, which in its turn is formed integrally with or rigidly attached to the spindle C, the outer end $c$ of which projects on the exterior of the boiler-shell. To this outer end $c$ is attached the indicating-arm D, to the end of which a disk E is affixed, corresponding in diameter with the float A and arranged in the same axial line. The disk may be centrally pivoted on the indicating-arm D, so as to turn thereon. In such cases a horizontal line is marked on its face, which indicates the level of the water. The arm D is fixed to the end $c$ of the spindle in any convenient manner and in some cases has an extension $c'$, to which an adjustable counterweight $c^2$ may be attached, serving the usual purpose, or a handle may be fixed in the same position which is of sufficient weight to serve as a counterweight. The handle may also be employed to move the float up and down, so as to feel the wash of the water.

The fitting G, through the center of which the spindle C passes, is formed by a cylindrical boss bored in its center to fit the spindle C and having a flange $g$ and a recess, the latter for a purpose to be hereinafter described. The flange $g$ has two or more holes $g'$ bored in it, through which pass screws for the purpose of fastening the fitting to the boiler-shell, a packing-ring $g^2$ being interposed between the flange and the shell for the purpose of forming an air-tight joint. When the device is applied to a boiler in which steam and water under pressure are contained, the recess before mentioned is employed to form a stuffing-box, a gland entering such recess in which any suitable packing $h$ is inserted. The gland H being pushed into the recess by means of screws $h'$ forces the packing into close contact with the spindle C, thus securing a steam and water tight joint, which prevents steam or water passing out along the line of the spindle C, while allowing the latter to turn freely in the gland. A less perfect packing suffices when the apparatus is applied to a tank the water in which is not under steam-pressure.

An especial feature of the form of our invention shown in Figs. 1 and 2 is that by boring the hole in the shell of the boiler of slightly-larger diameter than the float the latter, as well as the arm B and the spindle, can be passed or threaded through the hole to the position shown. This enables the device to be applied with very little work and in a very short time. In urgent cases this may even be done without drawing the fires by simply allowing the steam to escape while the necessary holes are drilled.

In some cases a graduated scale M, denoting in feet and inches the depth of the water in the boiler, may be applied to the exterior of the boiler, the arm D then serving as a hand or pointer. In such cases the disk E may be dispensed with.

Where the interior of the boiler is easily accessible, that part of the fitting G which enters the hole in the boiler-shell may be extended and its end screwed for engagement with a nut K, which upon being screwed up holds the fitting firmly in position.

It is obvious that by arranging the arms B and D in the same plane coincidently with each other the position of arm B and float A can be ascertained by inspection of the arm D or disk E.

Where it is desirable that the level of the water should be indicated at a position situate at some distance from the boiler, we employ mechanism as shown in Fig. 4, where A indicates the float; $m$, the short arm at right angles thereto; $M^\times$, a rod which connects the arm $m$ with one arm of a bell-crank lever $n$, the other arm of which is connected by a rod N with one end of an indicating-arm O, the other end of which may have a disk $o$ affixed to it. By this means the movement of the float A is accompanied by a corresponding movement of the disk $o$. If necessary, a normal line may be marked at a point $X'$, which enables the level of the water to be more accurately determined.

Two or more of these devices may be fixed at different levels to the same boiler.

Having now described our invention, what we claim as new, and desire to secure by Letters Patent, is—

1. In a device of the character described, a boiler having an opening in the shell thereof, a float adapted to be passed through the opening in the boiler-shell, a crank-arm on the float, a spindle on the end of the crank-arm, a bushing-plug mounted on the spindle and closing the opening in the boiler-shell, and an indicator-arm on the exposed end of the spindle and located in the same plane as the crank-arm, substantially as described.

2. In a device of the character described, a boiler having a circular opening in the shell thereof, an elongated cylindrical float slightly smaller in diameter than said opening so as to be capable of passing through the same, a crank-arm on one end of the float, a spindle on the end of the crank-arm, a bushing-plug mounted on the spindle and secured to the exterior of the boiler-shell tightly closing the opening therein and serving as a journal-bearing for the spindle, an indicator-arm carried on the exposed end of the spindle and located in the same plane as the crank-arm, and a scale on which the position of the float is visibly indicated by the position of the indicator-arm, substantially as described.

In witness whereof we have hereunto set our hands in presence of two witnesses.

CHARLES STRUTT.
OLIVER ARTHUR HOCKEY.

Witnesses:
FRED C. HARRIS,
N. LAWSON.